US009674768B2

(12) United States Patent
Qin et al.

(10) Patent No.: US 9,674,768 B2
(45) Date of Patent: Jun. 6, 2017

(54) METHOD AND DEVICE FOR ACCESSING WIRELESS NETWORK

(71) Applicant: Xiaomi Inc., Beijing (CN)

(72) Inventors: Qiuping Qin, Beijing (CN); Jun Yuan, Beijing (CN); Baichao Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 111 days.

(21) Appl. No.: 14/644,546

(22) Filed: Mar. 11, 2015

(65) Prior Publication Data

US 2016/0029299 A1 Jan. 28, 2016

Related U.S. Application Data

(63) Continuation of application No. PCT/CN2014/091592, filed on Nov. 19, 2014.

(30) Foreign Application Priority Data

Jul. 28, 2014 (CN) .......................... 2014 1 0364648

(51) Int. Cl.
H04W 12/06 (2009.01)
H04W 48/14 (2009.01)
(Continued)

(52) U.S. Cl.
CPC ........... H04W 48/14 (2013.01); H04W 12/06 (2013.01); H04W 48/06 (2013.01); H04W 36/08 (2013.01); H04W 84/12 (2013.01)

(58) Field of Classification Search
CPC ..... H04W 12/06; H04W 36/08; H04W 48/06; H04W 8/18
See application file for complete search history.

(56) References Cited

U.S. PATENT DOCUMENTS 9,084,176 B2* 7/2015 Majmundar .......... H04W 48/06
2002/0133600 A1* 9/2002 Williams ............... H04L 29/06
709/228

(Continued)

FOREIGN PATENT DOCUMENTS

CN 101192916 A 6/2008
CN 102638797 A 8/2012
(Continued)

OTHER PUBLICATIONS

International Search Report of PCT/CN2014/091592, from the State Intellectual Property Office of China, mailed Apr. 29, 2015.

(Continued)

Primary Examiner — Raj Jain
(74) Attorney, Agent, or Firm — Finnegan, Henderson, Farabow, Garrett & Dunner LLP

(57) ABSTRACT

A method for enabling a first terminal to access a wireless network, includes: receiving an access request sent from the first terminal, the access request including a terminal identification of the first terminal; determining whether the first terminal meets a condition based on the terminal identification included in the access request; sending a connection invitation to the first terminal if it is determined that the first terminal meets the condition; receiving a connection request sent from the first terminal based on the connection invitation; and enabling the first terminal to access the wireless network based on the connection request.

12 Claims, 7 Drawing Sheets

(51) Int. Cl.
*H04W 48/06* (2009.01)
*H04W 84/12* (2009.01)
*H04W 36/08* (2009.01)

(56) References Cited

U.S. PATENT DOCUMENTS

| | | | |
|---|---|---|---|
| 2002/0167909 A1* | 11/2002 | Balazinski | H04M 15/854 370/252 |
| 2007/0153732 A1 | 7/2007 | Yao | |
| 2009/0323658 A1* | 12/2009 | Balasubramanian | H04L 65/1069 370/338 |
| 2014/0137206 A1 | 5/2014 | Hansmann et al. | |
| 2015/0043561 A1 | 2/2015 | Xia | |

FOREIGN PATENT DOCUMENTS

| | | |
|---|---|---|
| CN | 102711282 A | 10/2012 |
| CN | 102791016 A | 11/2012 |
| CN | 103108167 A | 5/2013 |
| CN | 103428808 A | 12/2013 |
| CN | 103442097 A | 12/2013 |
| CN | 103532715 A | 1/2014 |
| CN | 103532946 A | 1/2014 |
| CN | 103686674 A | 3/2014 |
| CN | 103888265 A | 6/2014 |
| CN | 103916855 A | 7/2014 |
| CN | 104185304 A | 12/2014 |
| EP | 2595422 A2 | 5/2013 |
| JP | 2010-278862 A | 12/2010 |
| RU | 2414052 C2 | 3/2011 |
| RU | 2516482 C2 | 5/2014 |
| WO | WO 2010/038114 A1 | 4/2010 |
| WO | WO 2013-146564 A1 | 10/2013 |
| WO | WO 2013-159576 A1 | 10/2013 |

OTHER PUBLICATIONS

*Access Point ACL Filter Configuration Example*, Cisco, Jul. 17, 2006.
Wi-Fi Certified Wi-Fi Protected Setup: *Easing the User Experience for Home and Small Office Wi-Fi Networks*, WiFi Alliance, Dec. 2010.
Extended Search Report for European Application No. EP 15178706.6 from the European Patent Office, dated Nov. 11, 2015.
English version of International Search Report of PCT/CN2014/091592, from the State Intellectual Property Office of China, mailed Apr. 29, 2015.
Office Action dated May 31, 2016 in counterpart Russian Application No. 2015103744/07(005858) and English translation thereof.

* cited by examiner

METHOD AND DEVICE FOR ACCESSING WIRELESS NETWORK

CROSS REFERENCE TO RELATED APPLICATIONS

The present application is a continuation of International Application No. PCT/CN2014/091592, filed Nov. 19, 2014, which is based upon and claims priority to Chinese Patent Application No. 201410364648.7, filed Jul. 28, 2014, the entire contents of all of which are incorporated herein by reference.

TECHNICAL FIELD

The present disclosure relates to the field of communication technologies and, more particularly, to a method and a device for accessing a wireless network.

BACKGROUND

With the development of communication technologies, more and more users use terminals with a wireless access function to access wireless networks. A Wireless Fidelity (Wi-Fi) network is one of the mainstream wireless networks at present.

A conventional method for a terminal to access a Wi-Fi network generally includes the following steps. Firstly, the terminal detects one or more Wi-Fi network access devices, and generates a Wi-Fi network list including one or more Wi-Fi networks provided by the one or more Wi-Fi network access devices. A user of the terminal can then select a Wi-Fi network in the Wi-Fi network list and enter a password. Accordingly, the terminal sends a certification request carrying the password to the Wi-Fi network access device corresponding to the selected Wi-Fi network. The Wi-Fi network access device records the terminal as an authorized device after the password is successfully verified, and returns an authorization response to the terminal. After receiving the authorization response, the terminal sends a request to the Wi-Fi network access device to establish a connection, and the Wi-Fi network access device enables the terminal to access the Wi-Fi network based on the request.

In the conventional method, there are generally multiple input operations, such as selecting the Wi-Fi network and entering the password, required when the user connects the terminal to the Wi-Fi network. However, for a terminal other than a mobile phone or a tablet computer, such as a smart TV, a smart wearable device, a Wi-Fi camera, etc., the terminal may not include an input device for those input operations, which makes it inconvenient for the user to select a Wi-Fi network or enter a password.

SUMMARY

According to a first aspect of the present disclosure, there is provided a method for enabling a first terminal to access a wireless network, comprising: receiving an access request sent from the first terminal, the access request including a terminal identification of the first terminal; determining whether the first terminal meets a condition based on the terminal identification included in the access request; sending a connection invitation to the first terminal if it is determined that the first terminal meets the condition; receiving a connection request sent from the first terminal based on the connection invitation; and enabling the first terminal to access the wireless network based on the connection request.

According to a second aspect of the present disclosure, there is provided a method for a terminal to access a wireless network provided by a network access device, comprising: broadcasting an access request including a terminal identification of the terminal; receiving a connection invitation sent from the network access device, after it is determined that a condition is met based on the access request; and sending a connection request to the network access device based on the connection invitation, for the network access device to enable the terminal to access the wireless network.

According to a third aspect of the present disclosure, there is provided a device, comprising: a processor; and a memory for storing instructions executable by the processor, wherein the processor is configured to: receive an access request sent from a first terminal to access a wireless network provided by the device, the access request including a terminal identification of the first terminal; determine whether the first terminal meets a condition based on the terminal identification included in the access request; send a connection invitation to the first terminal if it is determined that the first terminal meets the condition; receive a connection request sent from the first terminal based on the connection invitation; and enable the first terminal to access the wireless network based on the connection request.

According to a fourth aspect of the present disclosure, there is provided a terminal to access a wireless network provided by a network access device, comprising: a processor; and a memory for storing instructions executable by the processor, wherein the processor is configured to: broadcast an access request including a terminal identification of the terminal; receive a connection invitation sent from the network access device, after it is determined that a condition is met based on the access request; and send a connection request to the network access device based on the connection invitation, for the network access device to enable the terminal to access the wireless network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
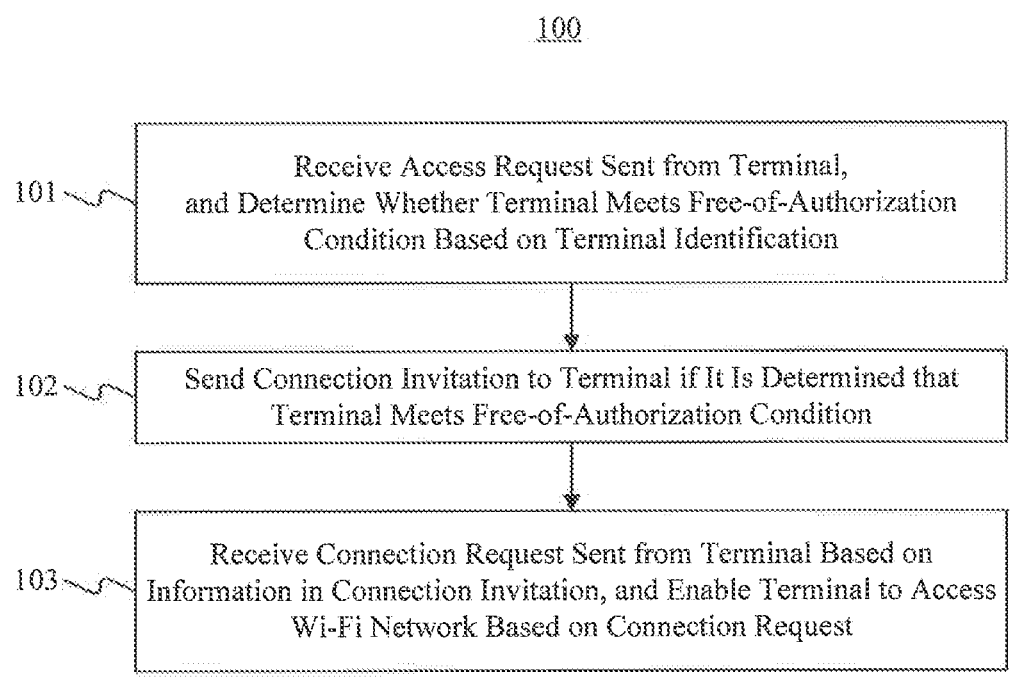
FIG. 1 is a flow chart of a method for accessing a wireless network, according to an exemplary embodiment.

FIG. 1 is a flow chart of a method 100 for accessing a wireless network, according to an exemplary embodiment. For example, the wireless network is a Wi-Fi network, and the method 100 is used in a network access device providing the Wi-Fi network. Referring to FIG. 1, the method 100 includes the following steps.

In step 101, the network access device receives an access request sent from a terminal, and determines whether the terminal meets a free-of-authorization condition based on a terminal identification included in the free-authorization access request. If it is determined that the terminal meets the free-of-authorization condition, the network access device can enable the terminal to access the Wi-Fi network without performing a direct authorization on the terminal device.

In step 102, the network access device sends a connection invitation to the terminal, if it is determined that the terminal meets the free-of-authorization condition.

In step 103, the network access device receives a connection request sent from the terminal based on the connection invitation, and enables the terminal to access the Wi-Fi network based on the connection request.

In the illustrated embodiment, the terminal is enabled to access the Wi-Fi network without receiving a user input operation at the terminal. Accordingly, the access efficiency is improved.

Figure 2:
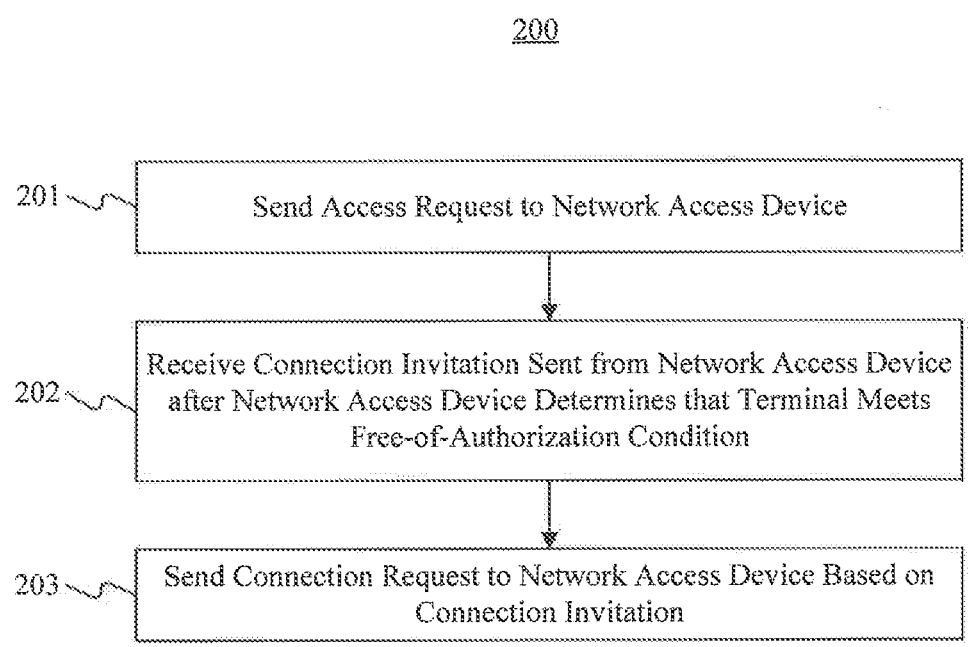
FIG. 2 is a flow chart of a method for accessing a wireless network, according to an exemplary embodiment.

FIG. 2 is a flow chart of a method 200 for accessing a wireless network, according to an exemplary embodiment. For example, the wireless network is a Wi-Fi network provided by a network access device, and the method 200 is used in a terminal, such as a smart TV, a smart wearable device, a Wi-Fi camera, etc. Referring to FIG. 2, the method 200 includes the following steps.

In step 201, the terminal sends, e.g., broadcasts, an access request to the network access device, the access request including a terminal identification of the terminal.

In step 202, the terminal receives a connection invitation sent from the network access device, after the network access device determines that the terminal meets a free-of-authorization condition based on the access request. If it is determined that the terminal meets the free-of-authorization condition, the network access device can enable the terminal to access the Wi-Fi network without performing a direct authorization on the terminal device.

In step 203, the terminal sends a connection request to the network access device based on the connection invitation, for the network access device to enable the terminal to access the Wi-Fi network.

In the illustrated embodiment, the terminal is enabled to access the Wi-Fi network without receiving a user input operation at the terminal. Accordingly, the access efficiency is improved.

Figure 3:
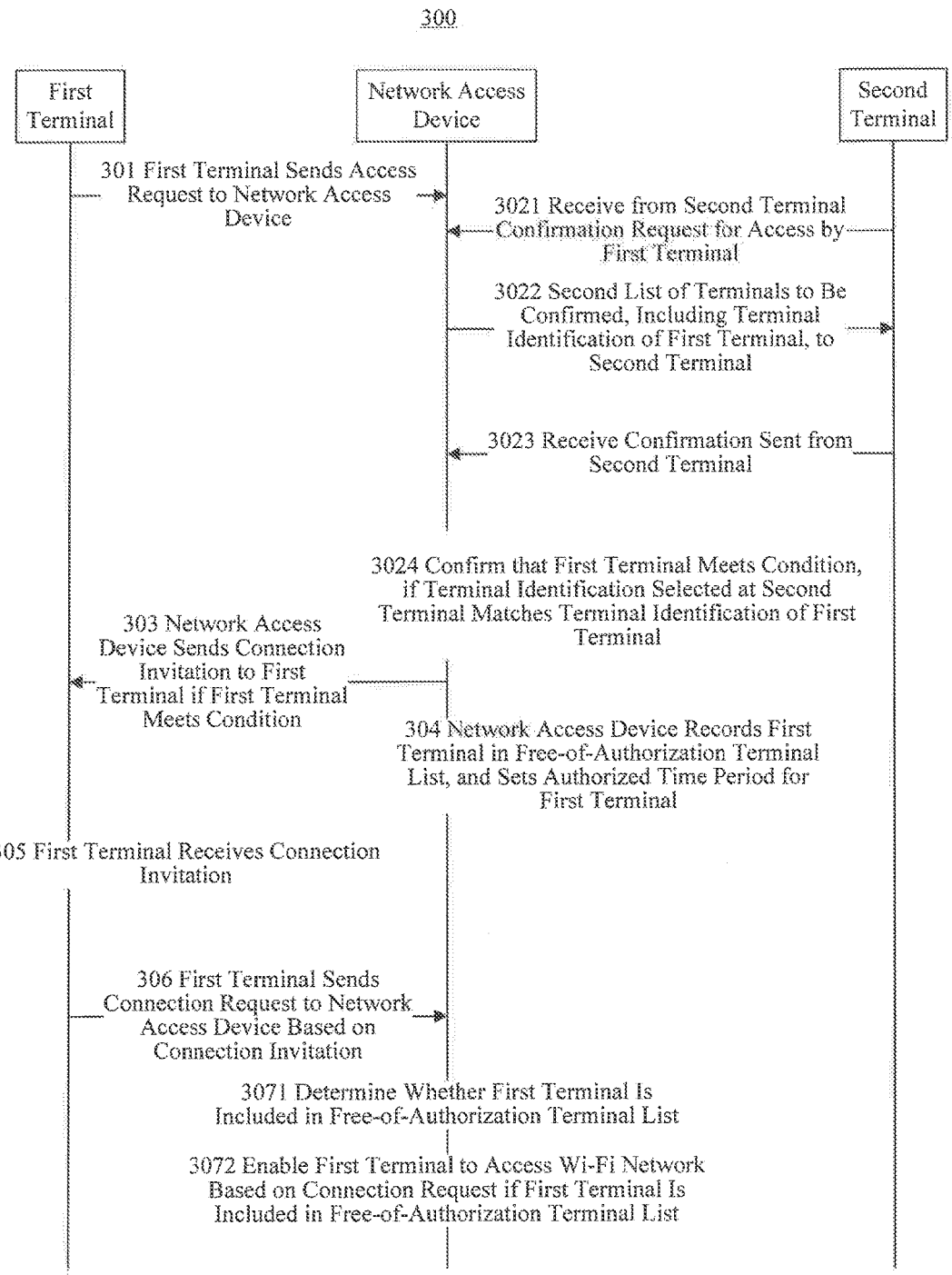
FIG. 3 is a flow chart of a method for accessing a wireless network, according to an exemplary embodiment.

FIG. 3 is a flow chart of a method 300 for accessing a wireless network, according to an exemplary embodiment. For example, the wireless network is a Wi-Fi network provided by a network access device. Referring to FIG. 3, the method 300 includes the following steps.

In step 301, a first terminal sends an access request to the network access device, the access request including a terminal identification of the first terminal.

For example, the first terminal is a Wi-Fi terminal to access the Wi-Fi network. In one exemplary embodiment, after the first terminal is turned on, the first terminal periodically broadcasts the access request through its wireless module.

Accordingly, the network access device receives the access request sent from the first terminal, and determines whether the first terminal meets a free-of-authorization condition based on the terminal identification included in the access request. If it is determined that the first terminal meets the free-of-authorization condition, the network access device can enable the terminal to access the Wi-Fi network without performing a direct authorization on the first terminal device.

For example, when receiving the access request, the network access device records into a list of terminals to be confirmed the terminal identification included in the access request and a time, e.g., a first time, when the access request is received. The time when the access request is received can then be used as a parameter to determine whether the first terminal meets the free-of-authorization condition.

In exemplary embodiments, the list of terminals to be confirmed in the network access device is provided to a second terminal possessing a confirmation permission, such that a user can view the list on the second terminal and select a terminal in the list. In one exemplary embodiment, prior to step 301, the second terminal is set to possess the confirmation permission for access to the Wi-Fi network by the first terminal.

Still referring to FIG. 3, in exemplary embodiments, whether the first terminal meets the free-of-authorization condition may be determined as follows. In step 3021, the network access device receives from the second terminal a confirmation request for the access to the Wi-Fi network by the first terminal. In step 3022, the list of terminals to be confirmed, including the terminal identification of the first terminal, is sent to the second terminal. In step 3023, the network access device receives a confirmation sent from the second terminal, the confirmation including a terminal identification selected at the second terminal. In step 3024, it is confirmed that the first terminal meets the free-of-authorization condition, if the terminal identification selected at the second terminal that is included in the confirmation matches the terminal identification of the first terminal included in the access request.

In exemplary embodiments, after confirming that the first terminal meets the free-of-authorization condition, the first terminal may be added into a free-of-authorization terminal list maintained by the network access device. For example, the free-of-authorization terminal list is used for recording terminals that have access to the Wi-Fi network without passing a direct authorization by the network access device, so that the network access device can further confirm a third terminal confirmed by a terminal in the free-of-authorization terminal list when the third terminal accesses the Wi-Fi network. As a result, access security is increased.

In step 303, the network access device sends a connection invitation to the first terminal, if it is determined that the first terminal meets the free-of-authorization condition. For example, the connection invitation includes an identification of the network access device, so that the first terminal can access the Wi-Fi network based on the identification of the network access device.

In step 304, the network access device records the first terminal in the free-of-authorization terminal list, and sets an authorized time period for the first terminal in the free-of-authorization terminal list. When the authorized time period expires, the first terminal will be deleted from the free-of-authorization terminal list, and will not be allowed to access the Wi-Fi network.

In exemplary embodiments, the network access device maintains the free-of-authorization terminal list based on authorized time periods corresponding to the respective terminals satisfying the free-of-authorization condition, and deletes from the free-of-authorization terminal list the record of a terminal for which the authorized time period expires.

In step 305, the first terminal receives the connection invitation sent from the network access device, after the network access device confirms the first terminal meets the free-of-authorization condition based on the access request of the first terminal.

In exemplary embodiments, when the first terminal has a display screen, the identification of the network access device sending the connection invitation is displayed on the display screen, to inform the user that the first terminal will be connected to the network access device. As a result, the user can confirm the connection to the network access device.

In step 306, the first terminal sends a connection request to the network access device based on the connection invitation, so that the network access device enables the first terminal to access the Wi-Fi network. For example, the connection request does not include password information.

Accordingly, the network access device receives the connection request sent from the first terminal, which enables the first terminal to access the Wi-Fi network based on the connection request.

In one exemplary embodiment, when the first terminal accesses the Wi-Fi network, the network access device further performs authorization on the first terminal.

In exemplary embodiments, the network access device performs a search of the terminal identification included in the connection request, in the free-of-authorization terminal list. If the terminal identification is included in the list, accessing the Wi-Fi network is enabled, and if the terminal identification is not included in the list, accessing the Wi-Fi network is refused.

Accordingly, in step 3071, the network access device determines whether the first terminal is included in the free-of-authorization terminal list. In step 3072, the first terminal is enabled to access the Wi-Fi network according to the connection request, if the first terminal is identified in the free-of-authorization terminal list.

In the illustrated embodiment, the first terminal is enabled to access the Wi-Fi network without receiving a user input operation at the first terminal. Accordingly, the access efficiency is improved.

Figure 4:
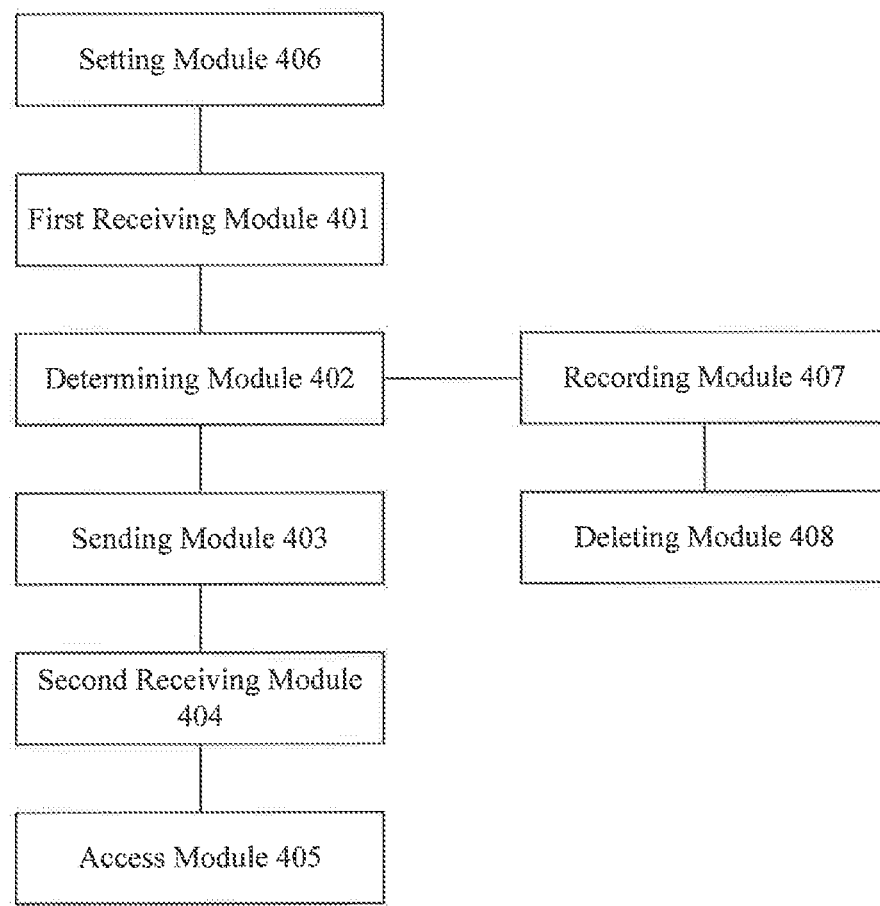
FIG. 4 is a block diagram of an apparatus for accessing a wireless network, according to an exemplary embodiment.

FIG. 4 is a block diagram of an apparatus 400 for accessing a wireless network, according to an exemplary embodiment. Referring to FIG. 4, the apparatus 400 includes a first receiving module 401 configured to receive from a first terminal an access request including a terminal identification of the first terminal, a determining module 402 configured to determine whether the first terminal meets a free-of-authorization condition based on the terminal identification included in the access request, and a sending module 403 configured to send a connection invitation to the first terminal if is determined that the first terminal meets the free-of-authorization condition.

In exemplary embodiments, the apparatus 400 also includes a second receiving module 404 configured to receive a connection request sent from the first terminal based on the connection invitation, and an access module 405 configured to enable the first terminal to access the wireless network based on the connection request.

In exemplary embodiments, the apparatus 400 further includes a setting module 406 configured to set a second terminal to possess a confirmation permission for access to the wireless network by the first terminal. Correspondingly, the determining module 402 includes a first receiving unit (not shown) configured to receive from the second terminal a confirmation request for the access to the wireless network by the first terminal, a sending unit (not shown) configured to send a terminal list to be confirmed, including the terminal identification of the first terminal, to the second terminal, a second receiving unit (not shown) configured to receive a confirmation sent from the second terminal, the confirmation including a terminal identification selected at the second terminal, and a first determination unit (not shown) configured to confirm the first terminal meets the free-of-authorization condition, if the terminal identification selected at the second terminal matches the terminal identification of the first terminal included in the access request.

In exemplary embodiments, the apparatus 400 further includes a recording module 407 configured to record the first terminal in a free-of-authorization terminal list, and set an authorized time period for the access to the wireless network by the first terminal, in the free-of-authorization terminal list. Accordingly, the access module 405 includes a second determination unit (not shown) configured to determine whether the first terminal is included in the free-of-authorization terminal list; and an access unit (not shown) configured to enable the first terminal to access the wireless network based on the connection request if the first terminal is included in the free-of-authorization terminal list.

In exemplary embodiments, the apparatus 400 further includes a deleting module 408 configured to delete a record corresponding to the first terminal from the free-of-authorization terminal list when the authorized time period expires.

Figure 5:
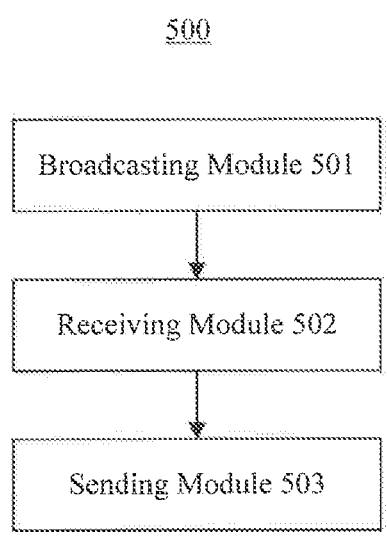
FIG. 5 is a block diagram of an apparatus for accessing a wireless network, according to an exemplary embodiment.

FIG. 5 is a block diagram of an apparatus 500 for accessing a wireless network, according to an exemplary embodiment. Referring to FIG. 5, the apparatus 500 includes a broadcasting module 501, a receiving module 502, and a sending module 503.

The broadcasting module 501 is configured to broadcast an access request to a network access device, the access request including a terminal identification. The receiving module 502 is configured to receive a connection invitation sent from the network access device after the network access device determines the apparatus 500 meets a free-of-authorization condition based on the access request. The sending module 503 is configured to send a connection request to the network access device based on the connection invitation, so that the network access device enables the apparatus 500 to access the wireless network.

Figure 6:
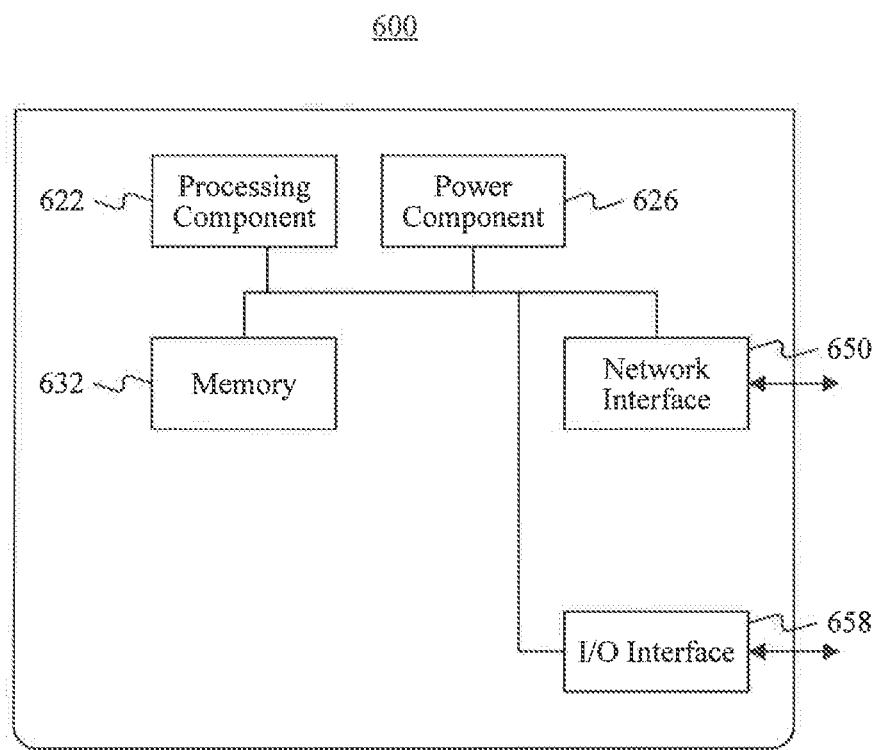
FIG. 6 is a block diagram of a network access device, according to an exemplary embodiment.

FIG. 6 is a block diagram of a network access device 600, according to an exemplary embodiment. Referring to FIG. 6, the network access device 600 includes a processing component 622 that further includes one or more processors, and memory resources represented by a memory 632 for storing instructions, such as application programs, executable by the processing component 622. The application programs stored in memory 632 may include one or more modules, each of which corresponds to a set of instructions. Moreover, the processing component 622 is configured to execute instructions for performing the above described methods.

The network access device 600 may also include a power component 626 configured to perform power management of the network access device 600, wired or wireless network interface(s) 650 configured to connect the network access device 600 to another network, and an input/output (I/O) interface 658. The network access device 600 may operate based on an operating system stored in the memory 632, such as Windows Server™, Mac OS X™, Unix™, Linux™, FreeBSD™, or the like.

In exemplary embodiments, there is also provided a non-transitory computer readable storage medium including instructions, such as included in the memory 632, executable by the processing component 622 in the network access device 600, for performing the above method. For example, the non-transitory computer-readable storage medium may be a ROM, a random access memory (RAM), a CD-ROM, a magnetic tape, a floppy disc, an optical data storage device, and the like.

Figure 7:
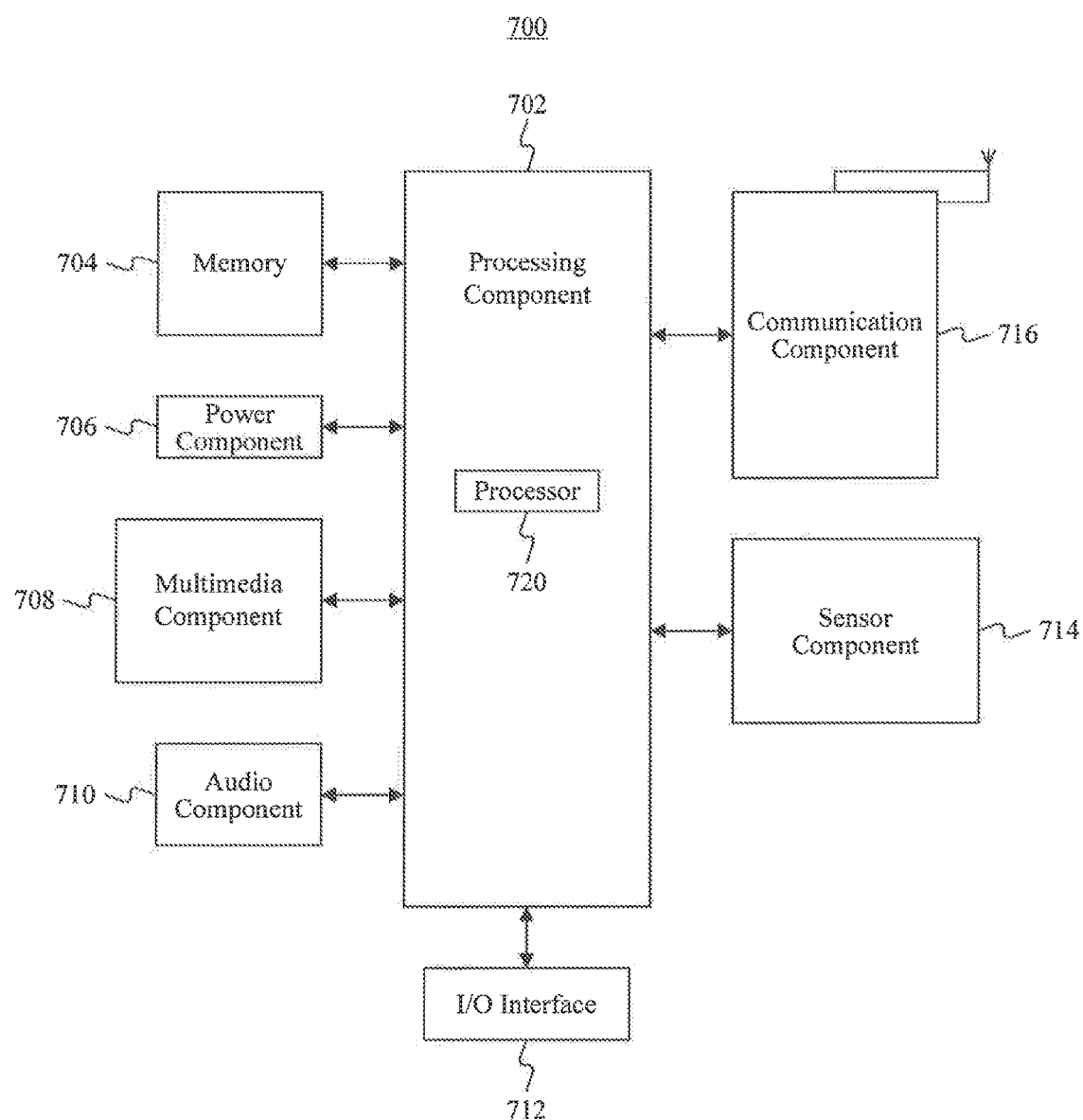
FIG. 7 is a block diagram of a terminal, according to an exemplary embodiment.

FIG. 7 is a block diagram of a terminal 700, according to an exemplary embodiment. For example, the terminal 700 may be a smart TV, a smart wearable device, a Wi-Fi camera, a mobile phone, a computer, a digital broadcast terminal, a messaging device, a gaming console, a tablet, a medical device, exercise equipment, a personal digital assistant and the like.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 usually controls overall operations of the terminal 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any application or method operated on the terminal 700, contact data, phonebook data, messages, pictures, videos, etc. The memory 704 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system, one or more power sources, and other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 708 includes a front camera and/or a rear camera. The front camera and/or the rear camera may receive an external multimedia datum while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone configured to receive an external audio signal when the terminal 700 is in an operation mode, such as a call mode, a recording mode, and a voice identification mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, a button, and the like. The button may include, but not limited to, a home button, a volume button, a starting button, and a locking button.

The sensor component 714 includes one or more sensors to provide status assessments of various aspects of the terminal 700. For instance, the sensor component 714 may detect an open/closed status of the terminal 700, relative positioning of components, e.g., the display and the keyboard, of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 may access a wireless network based on a communication standard, such as Wi-Fi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In exemplary embodiments, there is also provided a non-transitory computer readable storage medium including instructions, such as included in the memory 704, executable by the processor 720 in the terminal 700, for performing the above method. For example, the non-transitory computer-readable storage medium may be a ROM, a random access memory (RAM), a CD-ROM, a magnetic tape, a floppy disc, an optical data storage device, and the like.

One of ordinary skill in the art will understand that the above described modules/units can each be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

Other embodiments of the present disclosure will be apparent to those skilled in the art from consideration of the specification and practice of disclosure herein. This application is intended to cover any variations, uses, or adaptations of the present disclosure following the general principles thereof and including such departures from the present disclosure as coming within common knowledge or customary technical means in the art. It is intended that the specification and examples be considered as exemplary only, with a true scope and spirit of the present disclosure being indicated by the appended claims.

It will be appreciated that the present disclosure is not limited to the exact structure that has been described above and illustrated in the accompanying drawings, and that various modifications and changes can be made without departing from the scope thereof. The scope of the present disclosure is only defined by the appended claims.

What is claimed is:

1. A method for enabling a first terminal to access a wireless network, comprising:
    setting a second terminal to possess a confirmation permission for access to the wireless network by the first terminal;
    receiving an access request sent from the first terminal, the access request including a terminal identification of the first terminal;
    determining whether the first terminal meets a condition based on the terminal identification included in the access request;
    sending a connection invitation to the first terminal if it is determined that the first terminal meets the condition;
    receiving a connection request sent from the first terminal based on the connection invitation; and
    enabling the first terminal to access the wireless network based on the connection request.

2. The method according to claim 1, wherein the determining of whether the first terminal meets the condition comprises:
    receiving, from the second terminal, a confirmation request for the access to the wireless network by the first terminal;
    sending, to the second terminal, a list of one or more terminals to be confirmed including the terminal identification of the first terminal;
    receiving, from the second terminal, a confirmation including a terminal identification selected at the second terminal; and
    confirming that the first terminal meets the condition, if the terminal identification selected at the second terminal matches the terminal identification of the first terminal included in the access request.

3. The method according to claim 2, wherein after the confirming that the first terminal meets the condition, the method further comprises:
    recording the first terminal in a free-of-authorization terminal list; and
    setting, in the free-of-authorization terminal list, a time period allowing the access to the wireless network by the first terminal.

4. The method according to claim 3, wherein the enabling of the first terminal to access the wireless network comprises:
    determining whether the first terminal is included in the free-of-authorization terminal list; and
    enabling the first terminal to access the wireless network based on the connection request, if the first terminal is included in the free-of-authorization terminal list.

5. The method according to claim 3, wherein after the setting of the time period, the method further comprises:
    deleting a record corresponding to the first terminal from the free-of-authorization terminal list after the time period expires.

6. A method for a first terminal to access a wireless network provided by a network access device, comprising:
    broadcasting an access request, including a terminal identification of the first terminal, for receipt by the network access device, wherein a second terminal possesses a confirmation permission, set by the network access device, for access to the wireless network by the first terminal;
    receiving a connection invitation sent from the network access device, after it is determined that a condition is met based on the access request; and
    sending a connection request to the network access device based on the connection invitation, for the network access device to enable the first terminal to access the wireless network.

7. A device, comprising:
    a processor; and
    a memory for storing instructions executable by the processor,
    wherein the processor is configured to:
    set a second terminal to possess a confirmation permission for access, by a first terminal, to a wireless network provided by the device;
    receive an access request sent from the first terminal to access the wireless network, the access request including a terminal identification of the first terminal;
    determine whether the first terminal meets a condition based on the terminal identification included in the access request;
    send a connection invitation to the first terminal if it is determined that the first terminal meets the condition;
    receive a connection request sent from the first terminal based on the connection invitation; and
    enable the first terminal to access the wireless network based on the connection request.

8. The device according to claim 7, wherein the processor is further configured to:
   receive, from the second terminal, a confirmation request for the access to the wireless network by the first terminal;
   send, to the second terminal, a list of one or more terminals to be confirmed including the terminal identification of the first terminal;
   receive, from the second terminal, a confirmation including a terminal identification selected at the second terminal; and
   confirm that the first terminal meets the condition, if the terminal identification selected at the second terminal matches the terminal identification of the first terminal included in the access request.

9. The device according to claim 8, wherein the processor is further configured to:
   record the first terminal in a free-of-authorization terminal list; and
   set, in the free-of-authorization terminal list, a time period allowing the access to the wireless network by the first terminal.

10. The device according to claim 9, wherein the processor is further configured to:
    determine whether the first terminal is included in the free-of-authorization terminal list; and
    enable the first terminal to access the wireless network based on the connection request, if the first terminal is included in the free-of-authorization terminal list.

11. The device according to claim 9, wherein the processor is further configured to:
    delete a record corresponding to the first terminal from the free-of-authorization terminal list after the time period expires.

12. A first terminal to access a wireless network provided by a network access device, comprising:
    a processor; and
    a memory for storing instructions executable by the processor,
    wherein the processor is configured to:
       broadcast an access request, including a terminal identification of the first terminal, for receipt by the network access device, wherein a second terminal possesses a confirmation permission, set by the network access device, for access to the wireless network by the first terminal;
       receive a connection invitation sent from the network access device, after it is determined that a condition is met based on the access request; and
       send a connection request to the network access device based on the connection invitation, for the network access device to enable the first terminal to access the wireless network.

* * * * *